Figure 1:
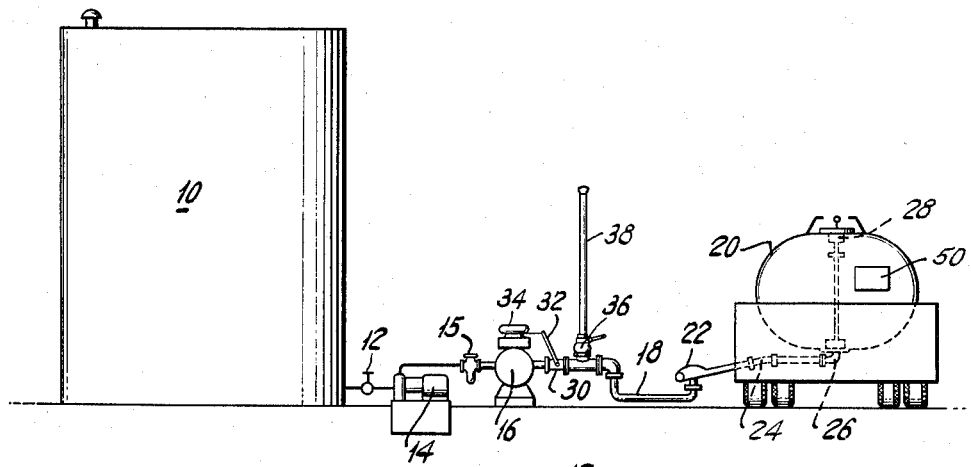

Aug. 2, 1960  J. A. SAVAGE  2,947,330
BOTTOM LOADING FOR TRUCK TANKS
Filed Nov. 8, 1957

INVENTOR
JOHN A. SAVAGE
BY
Richard S. Shreve, Jr.
ATTORNEY

United States Patent Office 2,947,330
Patented Aug. 2, 1960

2,947,330

BOTTOM LOADING FOR TRUCK TANKS

John A. Savage, 66 Prospect St., Summit, N.J.

Filed Nov. 8, 1957, Ser. No. 695,390

3 Claims. (Cl. 141—1)

This invention relates to bottom loading for truck tanks, and more particularly to filling stations for this purpose and methods of operating the same.

Bottom loading for truck tanks has the advantages over top loading of eliminating loading racks and risers, personal injury hazards from falls, impairment of tank finish, slow loading rates, topping off time, blowbacks, and foaming, and human failure factor in loading and most of the consequent spills.

In top loading which involves filling through an opening in the top of the truck tank, the rising level is visible through such opening, and the attendant watching such level pulls a cord to shut off the flow when the tank is full. In bottom loading the rising level is not thus visible and it is difficult to determine when to stop the filling.

The main objects of the present invention are to overcome this difficulty, to provide an automatic shut off for the fluid, and to determine the net capacity of respective different tank truck compartments in order to set the automatic shut off for that capacity.

A bottom loading filling station comprises a storage tank, a pump connected to the tank, a low level meter receiving from said pump, and a bottom filling hose or counterbalanced loading arm having swing joints and self-sealing couplings. This delivery conduit is normally full of liquid, and is connected to receiver half of the self-sealing coupling which precedes the truck tank foot valve. The opening of the tank's foot valve automatically actuates the tank vent.

According to the present invention the meter is a counter and automatic shut off, which can be preset to deliver a predetermined volume of liquid. Interposed between the meter and the delivery conduit is a manually opening self-closing valve having a sight glass. After the delivery conduit is connected to a truck tank, the foot valve is opened, the sight glass valve is opened, and the residual liquid in the truck tanks seeks its own level in the sight glass. A surge suppressor in sight glass prevents surge spillage. Each truck carries a chart calibrated in volumes corresponding to depths read on the sight glass, so that the net capacity of the particular tank truck can be determined from the sight glass reading, to set the automatic shut off. Then the self-closing valve is permitted to close, fluid from the storage is pumped through the meter and delivery conduit into the truck tank until capacity is reached, and the automatic shut off stops the flow.

Figure 2:
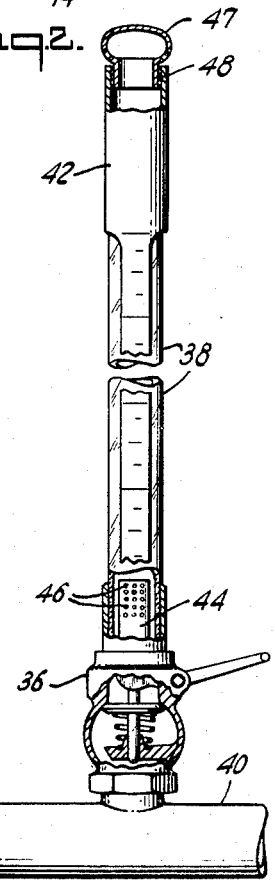

In the drawings:

Fig. 1 is a diagrammatic elevation of a bottom filling station for truck tanks according to and for carrying out the method of the preferred embodiment of the present invention; and Fig. 2 is an enlarged elevation of and partly in vertical section through the sight glass, manually operated valve and surge suppressor employed in Fig. 1.

In the form shown, the bottom filling station comprises a storage or supply tank 10, from which liquid, preferably fuel oil, but which may be gasoline or other liquid to be transported by tank trucks, passes through valve 12 to pump 14, thence through strainer 15 and meter 16, on through a discharge conduit 18 to the tank truck 20.

The discharge conduit 18 may be a hose, or a counterbalanced loading arm having swing joints 22 and a coupling 24 for connection to truck tank half of 24 which precedes the foot valve 26 of the tank truck 20 opening of which automatically actuates the tank vent 28. The coupling 24 is self-closing in response to disconnection of the two halves, so that the conduit 18 is normally full of liquid.

The meter 16 has an automatic shut off comprising a valve 30 actuated by a lever 32 connected to the counter 34 which can be preset to actuate the valve 30 to shut off the flow when a predetermined quantity of fluid has been delivered.

Interposed between the shut off valve 30 and the self-closing valve 24 is a backflow equalizing gauge and surge suppressor comprising a manually operated spring loaded self-closing valve 36, and a sight glass 38 shown in more detail in Fig. 2. The meter 16, and valve 36 are on a centerline of the order of eighteen inches above ground.

The manually operated valve 36 is connected to the stem of an inverted T-fitting 40, the bridge or through run of which is connected from the valve 30 to the discharge conduit 18. The valve 36 supports the sight glass 38, which comprises a brass pipe 42 slotted on each side to expose to view the pyrex glass tube.

The valve 36 also supports inside the sight glass 38 a surge suppressor 44 which may be a capped nipple having uniformly distributed drillings 46 of about 1/8-inch diameter. The sight glass 38 is calibrated in linear measure, preferably feet and inches, for about a seven foot height. The top of the pipe 42 is closed by a mushroom vent 47 fitted into the top thereof and sealed by a neoprene gasket 48.

When a tank truck 20 is brought in for filling, the conduit 18 is connected by coupling 24 to truck tank half of coupling. The foot valve 26 is then opened. The manual valve 36 is opened, and the residual liquid in the tank 20 causes the liquid in the conduit 18 to rise through the surge suppressor 44 into the sight glass 38, and come to rest at a level corresponding to the depth of residual liquid in the tank 20.

The tank 20 is provided with a chart or table 50 calibrated in units of volume, preferably gallons of net capacity, corresponding to inches read on the sight glass 38 for graduated degrees of filling of that particular tank. For example, an eighteen inch reading on the sight glass reads on the chart to require 2000 gallons of liquid to fill. After the sight glass is read, the valve 36 is permitted to close, and the calibrated chart is used to convert the reading to gallons of capacity. The automatic shut off meter 34 is set to close at that capacity, 2000 gallons in the example given, the pump 14 is started, and the fluid flows from the storage tank 10 into the truck tank 20.

When the 2000 gallons have passed into the tank, the automatic cut off stops the flow, and the attendant or meter linkage stops the pump 14. The coupling 24 is disconnected from the truck tank half, the coupling 24 being self-closing to maintain the conduit 18 full of liquid.

What is claimed is:

1. In a bottom loading filling station for truck tanks comprising a storage supply, a pump connected to said supply, a low level meter receiving from said pump, and a bottom filling delivery conduit receiving from said meter and having a self-closing delivery valve maintaining said conduit normally full of liquid for connection to the truck tank half, the improvement which comprises an automatic shut off for said meter, a sight glass mounted in the line between said meter and said bottom delivery conduit, a manual opening self-closing valve at the bottom of said sight glass connected to said conduit between said meter and said self-closing delivery valve whereby in open position of said manual valve residual liquid in the truck tank seeks its own level in said sight glass, so that when a chart is provided for each truck calibrated in linear measure and reading in volume units to indicate net capacity of its tank for filling corresponding to the respective linear readings of said sight glass, said automatic shut off meter may be set for that filling capacity.

2. Bottom loading filling station as claimed in claim 1, in which a surge suppressor is mounted in the line between said sight glass and said manual opening valve.

3. Method of filling truck tanks with liquid at the bottom thereof, which comprises storing the liquid in a storage tank from which the liquid may be passed, pumping said liquid from said storage tank through a low level meter on through a bottom filling delivery conduit, maintaining said conduit normally full of liquid, returning residual liquid from a truck tank to be filled back into said delivery conduit and establishing a free level at a point between said conduit and said meter to determine a linear measure of the depth of residual liquid in said truck tank to be filled, setting said meter for the capacity desired with reference to said linear reading, metering said pumped fluid, and cutting off the flow of said liquid through said meter when said desired capacity has been metered into said truck tank.

References Cited in the file of this patent

UNITED STATES PATENTS

| | | |
|---|---|---|
| Re. 22,710 | Cornell et al. | Jan. 22, 1946 |
| 138,882 | Goodrich | May 13, 1873 |
| 1,307,494 | Hawxhurst | June 24, 1919 |
| 1,327,990 | French | Jan. 13, 1920 |
| 2,190,574 | Szush | Feb. 13, 1940 |
| 2,258,636 | Young et al. | Oct. 14, 1941 |
| 2,728,486 | Scherer | Dec. 27, 1955 |